(12) United States Patent
Mihai

(10) Patent No.: US 8,439,421 B2
(45) Date of Patent: May 14, 2013

(54) FUEL LID

(75) Inventor: Ovidiu Cristian Mihai, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 562 days.

(21) Appl. No.: 12/639,055

(22) Filed: Dec. 16, 2009

(65) Prior Publication Data

US 2011/0140477 A1    Jun. 16, 2011

(51) Int. Cl.
*B62D 25/00* (2006.01)

(52) U.S. Cl.
USPC ..................... 296/97.22; 220/86.2

(58) Field of Classification Search .............. 296/97.22, 296/191; 220/86.2, 905
See application file for complete search history.

(56) References Cited

U.S. PATENT DOCUMENTS

| | | | |
|---|---|---|---|
| 2,503,031 A | | 4/1950 | Davidson |
| 4,776,486 A * | | 10/1988 | Mizusawa .................. 220/375 |
| 4,998,640 A | | 3/1991 | Edelhoff |
| 5,072,986 A * | | 12/1991 | Tai et al. .................. 296/97.22 |
| 5,533,766 A * | | 7/1996 | Farber .......................... 292/144 |
| 5,658,036 A * | | 8/1997 | Benoist ..................... 296/97.22 |
| 5,772,062 A * | | 6/1998 | Gramss ........................ 220/829 |
| 6,102,234 A | | 8/2000 | Kremer et al. |
| 6,193,093 B1 | | 2/2001 | Brunner |
| 6,234,555 B1 * | | 5/2001 | Emmerich et al. ......... 296/97.22 |
| 6,478,360 B1 * | | 11/2002 | Reutter ...................... 296/97.22 |
| 7,258,245 B2 | | 8/2007 | Bauer |
| 8,089,228 B2 * | | 1/2012 | Ballard ........................ 318/255 |
| 2005/0134079 A1 * | | 6/2005 | Busch et al. ............... 296/97.22 |
| 2006/0010769 A1 * | | 1/2006 | Pelz ............................... 49/141 |
| 2006/0169354 A1 | | 8/2006 | Walkowski et al. |
| 2008/0135552 A1 * | | 6/2008 | Baudoux et al. .......... 220/203.01 |
| 2008/0197660 A1 | | 8/2008 | Busch |
| 2009/0079225 A1 | | 3/2009 | Katou |
| 2011/0285165 A1 * | | 11/2011 | Baba et al. ................. 296/97.22 |
| 2011/0285166 A1 * | | 11/2011 | Baba et al. ................. 296/97.22 |

* cited by examiner

*Primary Examiner* — Jason S Morrow

(74) *Attorney, Agent, or Firm* — Clifford B. Vaterlaus; Emerson Thomson Bennett

(57) ABSTRACT

A vehicle fuel lid apparatus may include a lid and a linkage assembly that pivotally attaches the lid to the vehicle. The lid may be movable about the pivotal attachments between closed and open conditions.

12 Claims, 9 Drawing Sheets

FUEL LID

I. BACKGROUND

A. Field of Invention

This invention generally relates to motor vehicles and more specifically relates to a fuel lid that can be moved between a closed condition and an open condition with a four-bar linkage assembly.

B. Description of the Related Art

It is well known in the art for passenger vehicles to have a fuel tank which stores fuel used to operate the vehicle's engine. Typically a fuel filling pipe extends from the fuel tank up to an opening formed in the side of the vehicle's body. In order to access the top of the fuel filling pipe in order to fill the fuel tank with fuel, a fuel lid is moved from a closed condition where access to the fuel filling pipe through the opening is prevented to an open condition where access to the fuel filling pipe can be achieved through the opening. Once the fuel lid is opened, a cap can be removed from the outer end of the fuel filling pipe and fuel can then be added to the fuel filling pipe and thus to the fuel tank. Once the fuel tank is filled, the cap can be replaced and the fuel lid can then be moved back to the closed condition.

Typically, the fuel lid is moved between its open and closed conditions by pivoting or rotating the fuel lid about a hinge axis. While such hinged fuel lids generally work well for their intended purpose, they have drawbacks. One drawback is that the fuel lid, when opened, extends outside of the vehicle's outer styling surface (typically defined by an outer surface of a body panel). This extension beyond the outer styling surface means that the fuel lid requires a relatively strong support structure. This extension beyond the outer styling surface also means that, if the customer leaves the lid open, it could inadvertently contact another object as the vehicle is moved. Furthermore, the possibility that the customer may leave the lid open also means that certain industry safety requirements must be met—such as positioning the fuel lid to always open toward the front of the vehicle so that aerodynamic forces (created by driving the vehicle in a forward direction) will tend to close the fuel lid.

It is also known to provide fuel lids that move side to side when opened. A fuel lid that opens and closes using a linkage assembly as described below, however, is believed to be unknown and a significant improvement over existing technology.

II. SUMMARY

According to one embodiment of this invention, a fuel lid apparatus may be used with an associated vehicle having an outside surface with an opening and a fuel filling pipe used to communicate fuel from the opening to a fuel tank. The fuel lid apparatus may include: a lid and a linkage assembly having first and second linkage members each having a first portion pivotally attachable to the associated vehicle and a second portion pivotally attachable to the lid. The lid may be movable about the pivotal attachments, when the fuel lid apparatus is attached to the associated vehicle, between: (1) a first closed condition where the lid substantially closes the opening preventing access to the fuel filling pipe through the opening; and, (2) a second open condition where the lid provides access to the fuel filling pipe through the opening.

According to another embodiment of this invention, a method may include the steps of: (A) providing a fuel lid apparatus for use with an associated vehicle having an outside surface with an opening and a fuel filling pipe used to communicate fuel from the opening to a fuel tank; (B) providing the fuel lid apparatus with a lid; and, a linkage assembly having first and second linkage members each having a first portion pivotally attachable to the associated vehicle and a second portion pivotally attachable to the lid; and, (C) moving the lid about the pivotal attachments, when the fuel lid apparatus is attached to the associated vehicle, between: (1) a first closed condition where the lid substantially closes the opening preventing access to the fuel filling pipe through the opening; and, (2) a second open condition where the lid provides access to the fuel filling pipe through the opening.

According to yet another embodiment of this invention, a vehicle may include: a frame; a panel supported to the frame that defines an outside surface for the vehicle and that has an opening; a fuel tank supported to the frame; a fuel filling pipe used to communicate fuel from the opening to the fuel tank and having a first end operatively attached to the fuel tank and a second end positioned juxtaposed to the opening in the panel; a cover cap attachable to and detachable from the second end of the fuel filling pipe; and, a fuel lid apparatus including: (1) a support structure having a first portion attached to the panel and a second portion attached to the fuel filling pipe, the support structure defining an inner space into which the second end of the fuel filling pipe extends; (2) a lid; and, (3) a linkage assembly having first and second linkage members each having a first portion pivotally attached to the support structure and a second portion pivotally attached to the lid. The lid may be movable about the pivotal attachments between: (1) a first closed condition where the lid substantially closes the opening preventing access to the fuel filling pipe through the opening; and, (2) a second open condition where the lid provides access to the fuel filling pipe through the opening. The lid may remain inside the outside surface of the panel when the fuel lid apparatus is in the first closed condition and when the fuel lid apparatus is in the second open condition. The lid may be positioned substantially within the inner space of the support structure when the fuel lid apparatus is in the second open condition.

One advantage of this invention is that a fuel lid does not extend outside of the vehicle's outer styling surface.

Another advantage of this invention is that a relatively strong support structure is not required for a fuel lid.

Another advantage of this invention is that reliability in opening and closing a fuel lid can be increased.

Still another advantage of this invention is that if a customer leaves the lid open, it will not inadvertently come into contact another object as the vehicle is moved.

Yet another advantage of this invention is that the fuel lid will not be subject to significant aerodynamic forces.

Other benefits and advantages of this invention will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION

Figure 1:
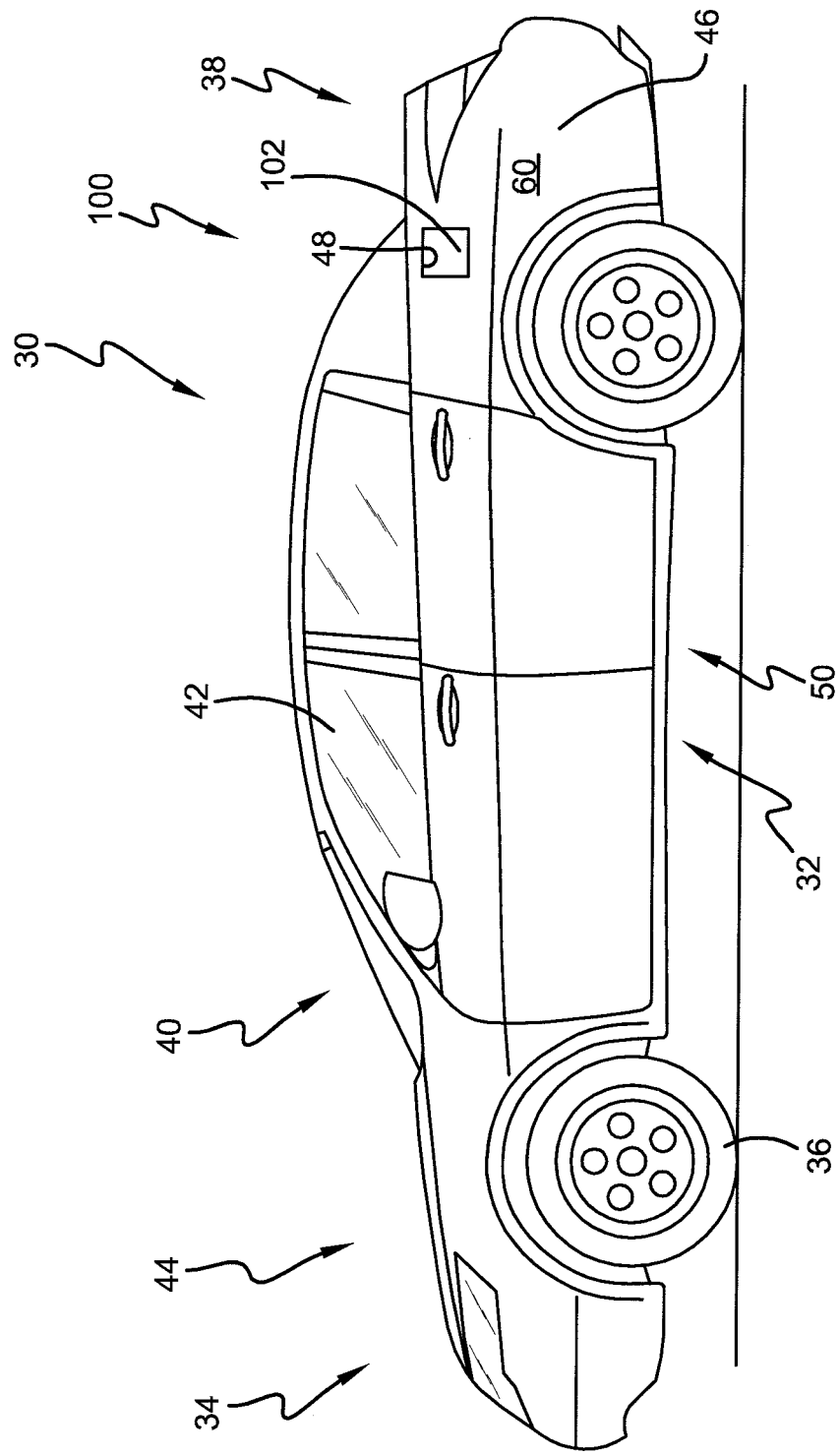
FIG. 1 is a side view of a vehicle equipped with a fuel lid apparatus according to one embodiment of this invention.

Referring now to the drawings wherein the showings are for purposes of illustrating embodiments of the invention only and not for purposes of limiting the same, and wherein like reference numerals are understood to refer to like components, FIG. 1 shows a vehicle 30 having a fuel lid apparatus 100 according to one embodiment of this invention. While the vehicle 30 shown is an automobile, it is to be understood that the fuel lid apparatus 100 of this invention will work well with any vehicle including, but not limited to, cars, trucks, sport utility vehicles, cross-over vehicles, off-road vehicles, all-terrain vehicles, and airplanes as well as other passenger carrying devices such as boats. This invention may also work well in non-vehicle applications.

With continuing reference to FIG. 1, the vehicle 30 may include a frame 32 and a body 40 that is supported to the frame and that defines a passenger compartment 42 for housing passengers as is well known in the art, a locomotion compartment 44, and a storage compartment or trunk 38. The vehicle 30 may also include a locomotion source, such as an internal combustion engine (ICE) 34, mounted to the frame 32 and positioned substantially within the locomotion compartment 44. The vehicle 30 may also have one or more ground engaging wheels 36 for uses well known in the art such as steering and transferring power from the locomotion source 34 to provide locomotion for the vehicle 30.

Figure 2:
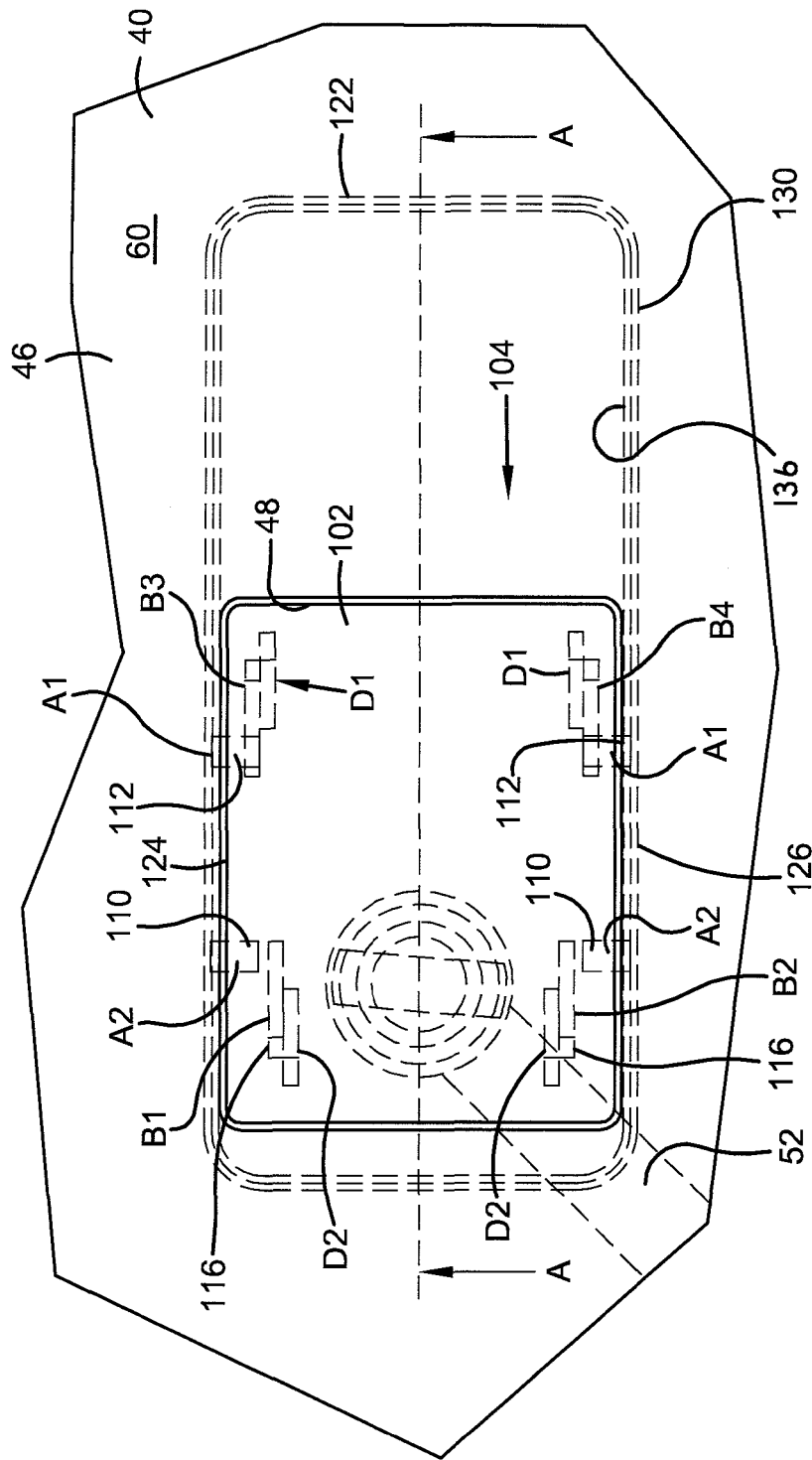
FIG. 2 is a close up side view of the vehicle shown in FIG. 1 showing where fuel filling activity takes place.
Figure 3:
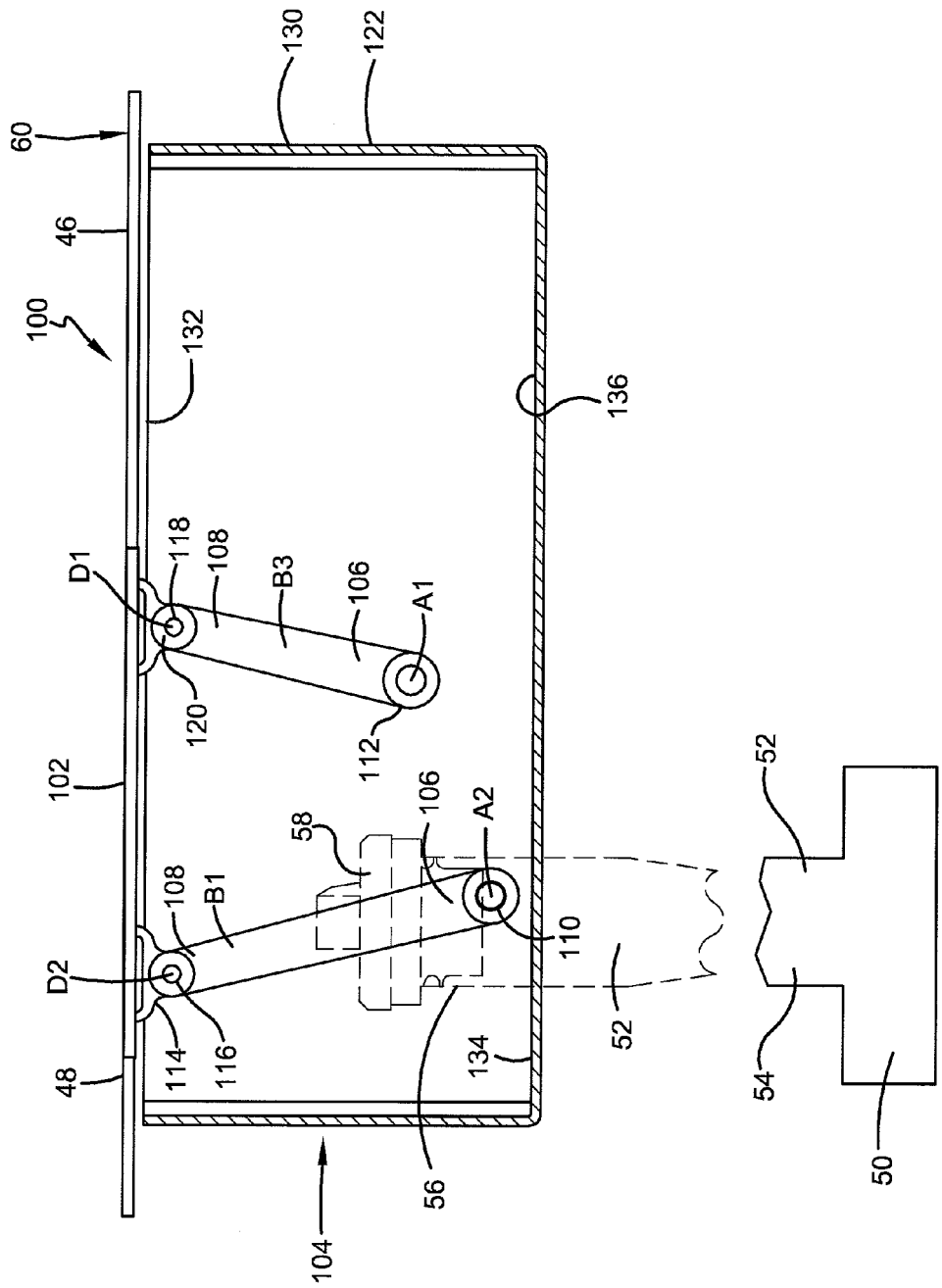
FIG. 3 is primarily a top sectional view of a fuel lid apparatus according to one embodiment of this invention.

With reference now to FIGS. 1-3, the body 40 may be formed of one or more panels 46 that define an outside surface 60 for the vehicle 30 in any conventional manner. One of the panels 46 may have an opening 48 formed therethrough. The opening 48 may be of any size and shape chosen with the sound judgment of a person of skill in the art. The vehicle 30 may also include a fuel tank 50, shown schematically in the FIGURES, and a fuel filling pipe 52 used to communicate fuel from the opening 48 to the fuel tank 50 so that the fuel tank 50 can be filled with fuel. The fuel filling pipe 52 may thus have a first end 54 operatively attached to the fuel tank 50 and a second end 56 positioned juxtaposed to the opening 48 in the panel 46. A cover cap 58 may be attachable to and detachable from the second end 56 of the fuel filling pipe 52 in any manner such as via a threading engagement as is shown and is well known in the art.

With reference now to FIGS. 1-4, one embodiment of the fuel lid apparatus 100 will now be described. The fuel lid apparatus 100 may include a lid 102 and a linkage assembly 104 that is used to support the lid 102 to the vehicle 30 and to move the lid 102 between: a first closed condition (shown in solid lines in the FIGURES) where the lid 102 substantially closes the opening 48 preventing access to the fuel filling pipe 52 through the opening 48; and, a second open condition (shown in dashed lines in the FIGURES) where the lid 102 provides access to the fuel filling pipe 52 through the opening 48. The linkage assembly 104 may include any number and type of linkage members attached to the lid 102 and vehicle 30 in any location and manner chosen with the sound judgment of a person of skill in the art. In one embodiment, not shown, a total of two linkage members may be used. The two linkage members may be disposed, for example, centrally in vertical direction. In another embodiment, the two linkage members may be disposed diagonally. In yet another embodiment, not shown, a total of three linkage members may be used. Two of the three linkage members may be disposed at the front of the lid 102, for example, and the third linkage member may be disposed at the rear of the lid 102. Alternatively, one of the three linkage members may be disposed at the front of the lid 102 and the other two linkage members may be disposed at the rear of the lid 102. For the embodiment shown, the linkage assembly 104 is a four bar linkage assembly including first, second, third and fourth bars or linkage members B1, B2, B3, and B4. In the view shown in FIG. 2, all four linkage members can be seen while only the relative top two, B1, B3 can be seen in the other FIGURES. Each linkage member may have a first portion 106 pivotally attachable to the vehicle 30 and a second portion 108 pivotally attachable to the lid 102. For the embodiment shown in FIGS. 3-4, the first portions 106 are at a first end of the linkage members and the second portions 108 are at a second end of the linkage members. The linkage members B1, B2, B3 and B4 can have any size and shape and may be formed of any material chosen with the sound judgment of a person of skill in the art.

With continuing reference to FIGS. 1-4, the pivotal attachments between the linkage assembly 104 and the vehicle 30 and the lid 102 can be any chosen with the sound judgment of a person of skill in the art. The degrees of freedom, for example, provided by the pivotal attachments can be any chosen with the sound judgment of a person of skill in the art. In one embodiment, not shown, at least one of the pivotal attachments has three degrees of freedom—similar to a ball and socket type connection. For the embodiment shown in FIGS. 2-4, the pivotal attachments between the first and second linkage members B1, B2 and the vehicle 30 are labeled A2. The two pivotal attachments A2 may be collinear, as shown, or in another embodiment they may be non-collinear. Each pivotal attachment A2 may comprise a pivot pin 110 attached to the vehicle 30 and about which the corresponding linkage member B1, B2 pivots. The pivotal attachments between the third and fourth linkage members B3, B4 and the vehicle 30 are labeled A1. The two pivotal attachments A1 may be collinear, as shown, or in another embodiment they may be non-collinear. Each pivotal attachment A1 may comprise a pivot pin 112 attached to the vehicle 30 and about which the corresponding linkage member B3, B4 pivots. The pivotal attachments between the first and second linkage members B1, B2 and the lid 102 are labeled D2. The two pivotal attachments D2 may be collinear, as shown, or in another embodiment they may be non-collinear. Each pivotal attachment D2 may comprise a pivot pin 116 attached to at least one bracket member 114 extending from a back surface of the lid 102 and about which the corresponding linkage member B1, B2 pivots. In another embodiment, a bracket member 114 is not required and the pivot pin 116 is attached directly to the lid 102. The pivotal attachments between the third and fourth linkage members B3, B4 and the lid 102 are labeled D1. The two pivotal attachments D1 may be collinear, as shown, or in another embodiment they may be non-collinear. Each pivotal attachment D1 may comprise a pivot pin 118 attached to at least one bracket member 120 extending from a back surface of the lid 102 and about which the corresponding linkage member B3, B4 pivots.

Still referring to FIGS. 1-4, the manner in which the linkage assembly 104 pivotally attaches to the vehicle 30 can be any chosen with the sound judgment of a person of skill in the art. The pivotal attachments A1, A2 may be made, in one embodiment, to a support structure 122 that is attached to the vehicle 30. In one specific embodiment, the pivotal attachments A1, A2 are made, as shown in FIG. 2, to upper and lower portions 124, 126 of the support structure 122. The support structure 122, in one embodiment, is an adaptor box 130 that is fixedly attached to a panel 46 in any manner chosen with the sound judgment of a person of skill in the art such as with a snapping connection, a fastening connection or with an adhesive connection. The fuel filling pipe 52 may also be attached to the adaptor box 130 in any manner chosen with the sound judgment of a person of skill in the art such as with a snapping connection, a fastening connection or with an adhesive connection. In one specific embodiment, shown, a relatively outside portion 132 of the adaptor box 130 is attached to the panel 46 and a relatively inside portion 134 of the adaptor box 130 is attached to the fuel filling pipe 52. This provides a very secure support arrangement that is easy to assemble. The adaptor box 130 may define an inner space 136 into which the second end 56 of the fuel filling pipe 52 extends.

As noted above, the linkage members B1, B2, B3 and B4 can have any size and shape chosen with the sound judgment of a person of skill in the art. For the embodiment shown in FIGS. 2-3, the first and second linkage member B1, B2 are substantially the same size and shape and remain substantially parallel to each other as the fuel lid apparatus 100 is being moved between the first closed condition and the second open condition. The third and fourth linkage member B3, B4 also are substantially the same size and shape and remain substantially parallel to each other as the fuel lid apparatus 100 is being moved between the first closed condition and the second open condition. However, for this embodiment the first and third linkage member B1, B3 are substantially different in at least one of size and shape, and are not substantially parallel to each other as the fuel lid apparatus 100 is being moved between the first closed condition and the second open condition. Note that the length of the first linkage member B1 is substantially longer that the length of the third linkage member B3. Some other differences between linkage members will be discussed further below.

The linkage members B1, B2, B3 and B4 can also have any orientation chosen with the sound judgment of a person of skill in the art. In one embodiment, shown in FIG. 2, the first and third linkage member B1, B3 are above a horizontal plane A-A that intersects a vertical midpoint of the second end 56 of the fuel filling pipe 52 and the second and fourth linkage member B2, B4 are below the horizontal plane A-A. Note also for this embodiment that the first, second, third and fourth linkage members B1, B2, B3, B4, remain substantially within the inner space 136 of the adaptor box 130 for the following three conditions: (1) when the fuel lid apparatus 100 is in the first closed condition; (2) when the fuel lid apparatus 100 is in the second open condition; and, (3) at all times when the fuel lid apparatus 100 is being moved between the first closed condition and the second open condition.

With reference now to FIGS. 2-5, by controlling the size and shape of the first, second, third and fourth linkage members B1, B2, B3, B4, and the positions of the pivotal attachments A1, A2, D1, D2, the fuel lid apparatus 100 can be optimized to fully control the positioning and trajectory of the lid 102 in any manner chosen with the sound judgment of a person of skill in the art. In one embodiment the lid 102 remains inside the outside surface 60 of the vehicle 30 when the fuel lid apparatus 100 is in the closed condition. This is shown, for example, in FIG. 4 where the lid 102 is shown in solid lines. Note that there may be a relatively small clearance G, shown in FIG. 2, between the lid 102 and the panel 46. In another embodiment, the lid 102 remains inside the outside surface 60 of the vehicle 30 when the fuel lid apparatus 100 is in the open condition. This is shown in, for example, FIG. 4 where the lid 102 is shown in dashed lines. In yet another embodiment, the lid 102 remains inside the outside surface 60 at all times when the fuel lid apparatus 100 is being moved between the closed condition and the open condition. This is shown by observing both the solid lines and the dashed lines in FIG. 5. In embodiments where the adaptor box 130 is used, the lid 102 may be positioned substantially within the inner space 136 when the fuel lid apparatus 100 is in the open condition, as shown. This positioning of the lid 102 inside the outside surface 60 of the vehicle 30 when the lid 102 is open prevents the lid 102 from being exposed to damage and from being exposed to the high loading situations known in the art. In one embodiment, shown in FIG. 5, a seal member 138 may be attached between the lid 102 and the rim of the opening 48 to create a sealing contact between the lid 102 in the closed condition and the panel 46. The seal member 138 can be of any type, size, and material chosen with the sound judgment of a person of skill in the art. In one specific embodiment, the seal member 138 is formed of rubber and is larger than the opening 48.

Figure 4:
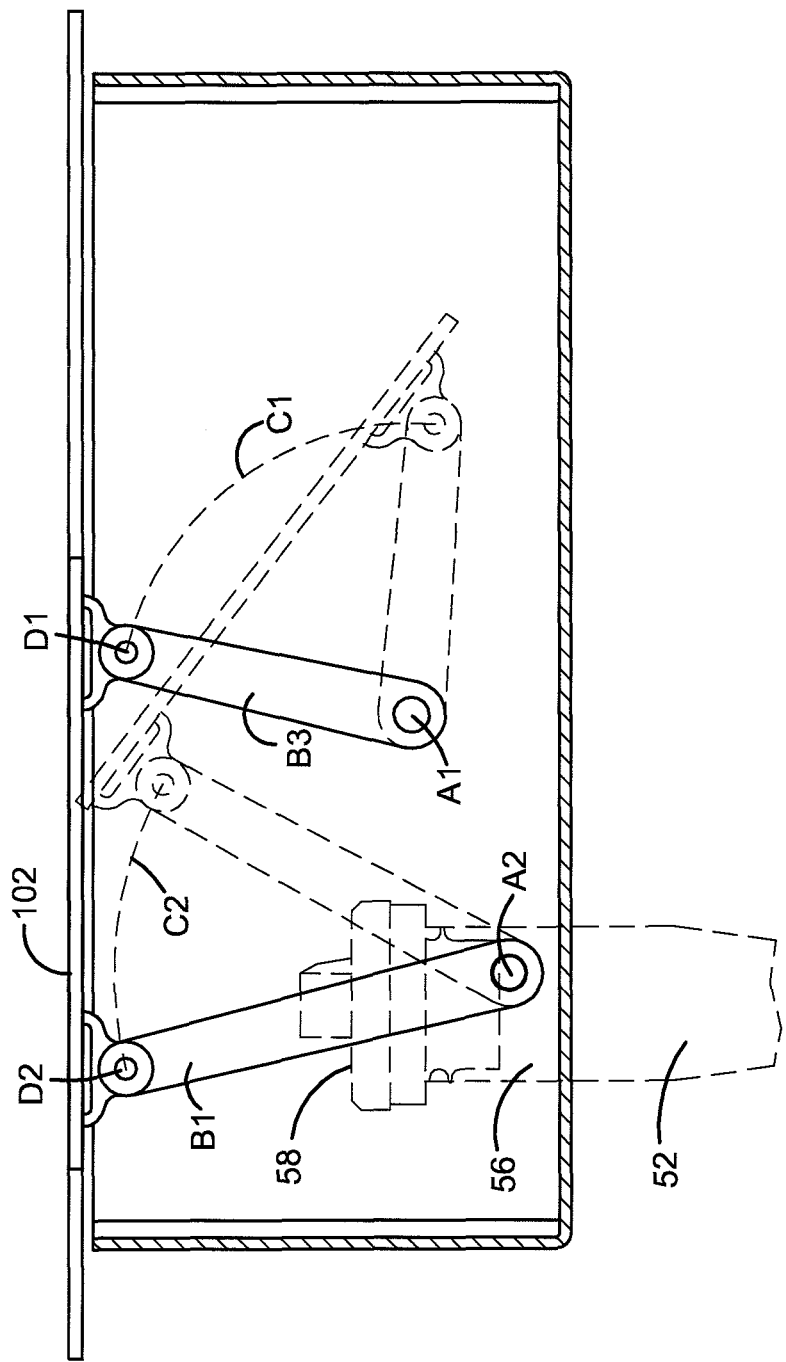
FIG. 4 is a view similar to that shown in FIG. 3 but showing a fuel lid apparatus according to another embodiment of this invention.
Figure 5:
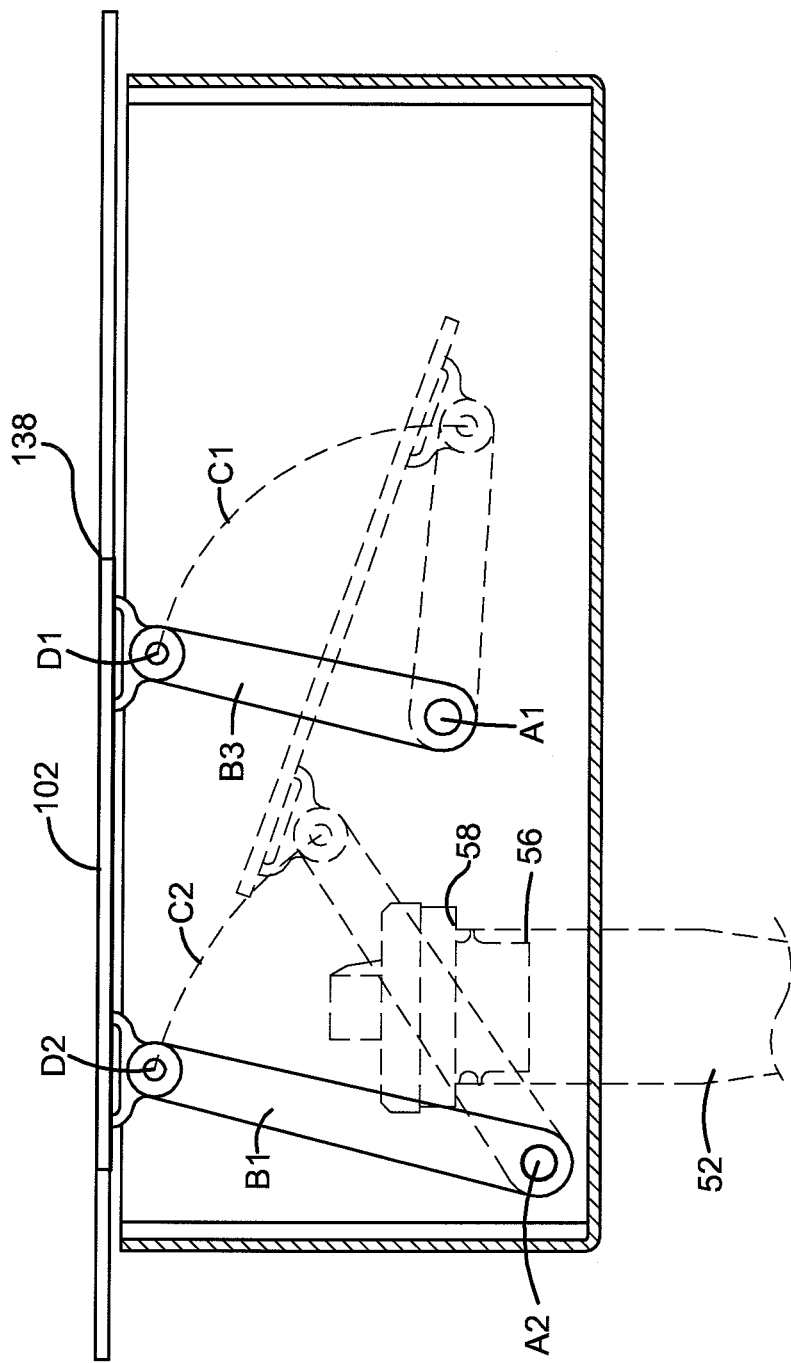
FIG. 5 is a view similar to that shown in FIG. 3 but showing a fuel lid apparatus according to another embodiment of this invention.
Figure 6:
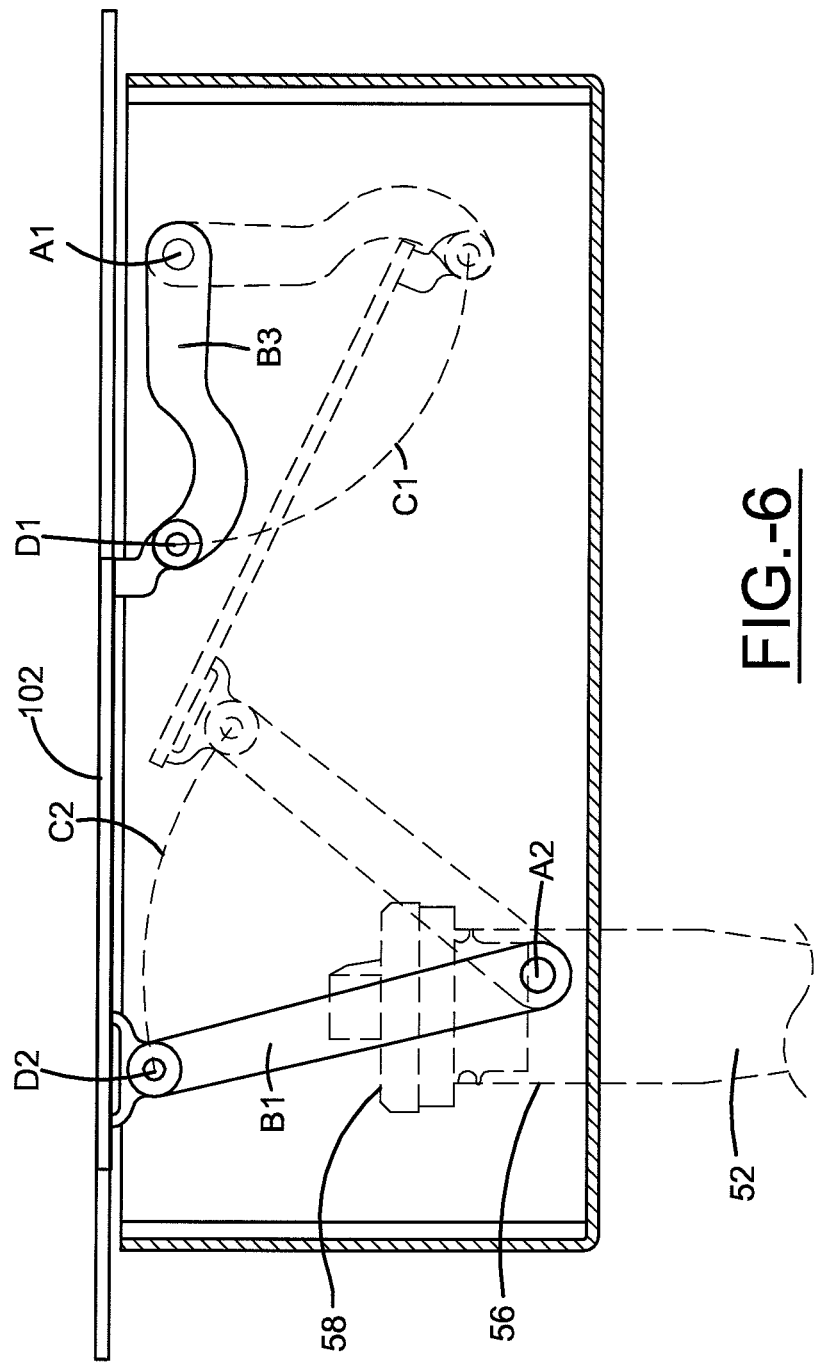
FIG. 6 is a view similar to that shown in FIG. 3 but showing a fuel lid apparatus according to another embodiment of this invention.

With reference now to FIGS. 1-8, the motion of the lid 102 as it is moved between the closed and opened conditions can be observed by noting the shapes of the transverse movement of the pivotal attachments A1, A2, D1, D2. For the embodiments shown in FIGS. 3-8, the locations of the pivotal attachments A1, A2 remain constant with respect to the vehicle 30. Thus, they have no transverse movement. The shapes of the transverse movement of the pivotal attachments D1, D2 shown in FIGS. 4 and 5 are arced as shown with references C1 and C2 respectively. Because the locations of the pivotal attachments A1, A2 remain constant, the arcs C1, C2 are arcs of a circle having a center point defined by A1, A2, respectively. While the shapes of transverse movement of the pivotal attachments A1, A2, D1, D2 described are non-moving or arc shaped, it should be understood that any motion chosen with the sound judgment of a person of skill in the art will work well with this invention. One alternate embodiment is shown in FIG. 6 where the size and shape of the linkage members B1, B2, B3, B4, and the positions of the pivotal attachments A1, A2, D1, D2, have been controlled to provide that when the lid 102 is opened the pivotal attachments D2 moves along arc C2 in a clockwise direction (as shown in FIG. 6) while the pivotal attachments D1 moves along arc C1 in a counterclockwise direction (as shown in FIG. 6).

Figure 7:
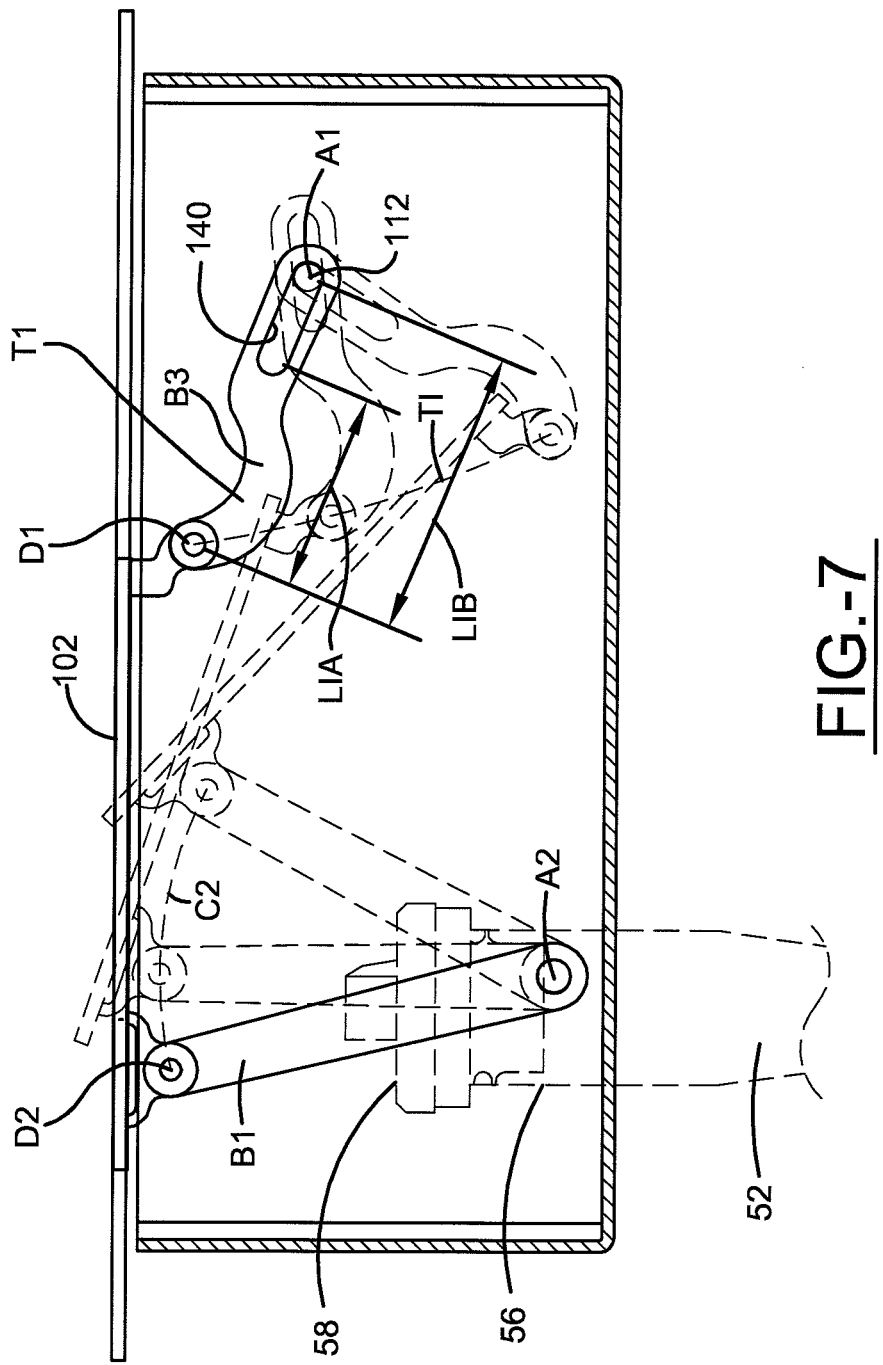
FIG. 7 is a view similar to that shown in FIG. 3 but showing a fuel lid apparatus according to another embodiment of this invention.

While the linkage members B1, B2, B3, B4 described above have a constant effective length, in other embodiments at least one of the linkage members B1, B2, B3, B4 has an effective length that varies as the fuel lid apparatus 100 is moved between the closed condition and the open condition. FIG. 7 shows, for example, an embodiment where the linkage members B3, B4 have a slot 140 having a longitudinal axis. The pin 112 which defines the pivotal attachments A1 is received within the slot 140 and moves along the longitudinal axis as the fuel lid apparatus 100 is moved between the closed condition and the open condition. As a result, the linkage members B3, B4 have an effective length that varies between L1A (the distance between the pivotal attachment D1 and the proximal end of the slot 140 when the pivotal attachment A1 is positioned there) and L1B (the distance between the pivotal attachment D1 and the distal end of the slot 140 when the pivotal attachment A1 is positioned there). Note that for this embodiment the pivotal attachments D2 move along a circular arc C2 but the pivotal attachments D1 move along a non-circular trajectory T1. While the slot 140 shown is provided in the connection to the pivotal attachments A1, it should be understood that the slot 140 can be provided at any location chosen with the sound judgment of a person of skill in the art. The slot 140 may be provided, for example, at the connection to the pivotal attachments D1.

While the method of providing a variable effective length for at least one of the linkage members B1, B2, B3, B4 described above with reference to FIG. 7 includes the use of a slot 140, it should be understood that any manner of providing a variable effective length chosen with the sound judgment of a person of skill in the art will work with this invention. In another embodiment shown in FIG. 8, for example, a linkage member may include first and second members 144, 146 that move telescopically with respect to each other. It is also contemplated to use a biasing device 150 such as a spring between the first and second members 144, 146 to bias the first and second members 144, 146 toward each other or away from each other, depending on the design. If a spring (or multiple springs) is used, it can be of any type chosen with the sound judgment of a person of skill in the art including a compression spring and a torsion spring.

Figure 8:
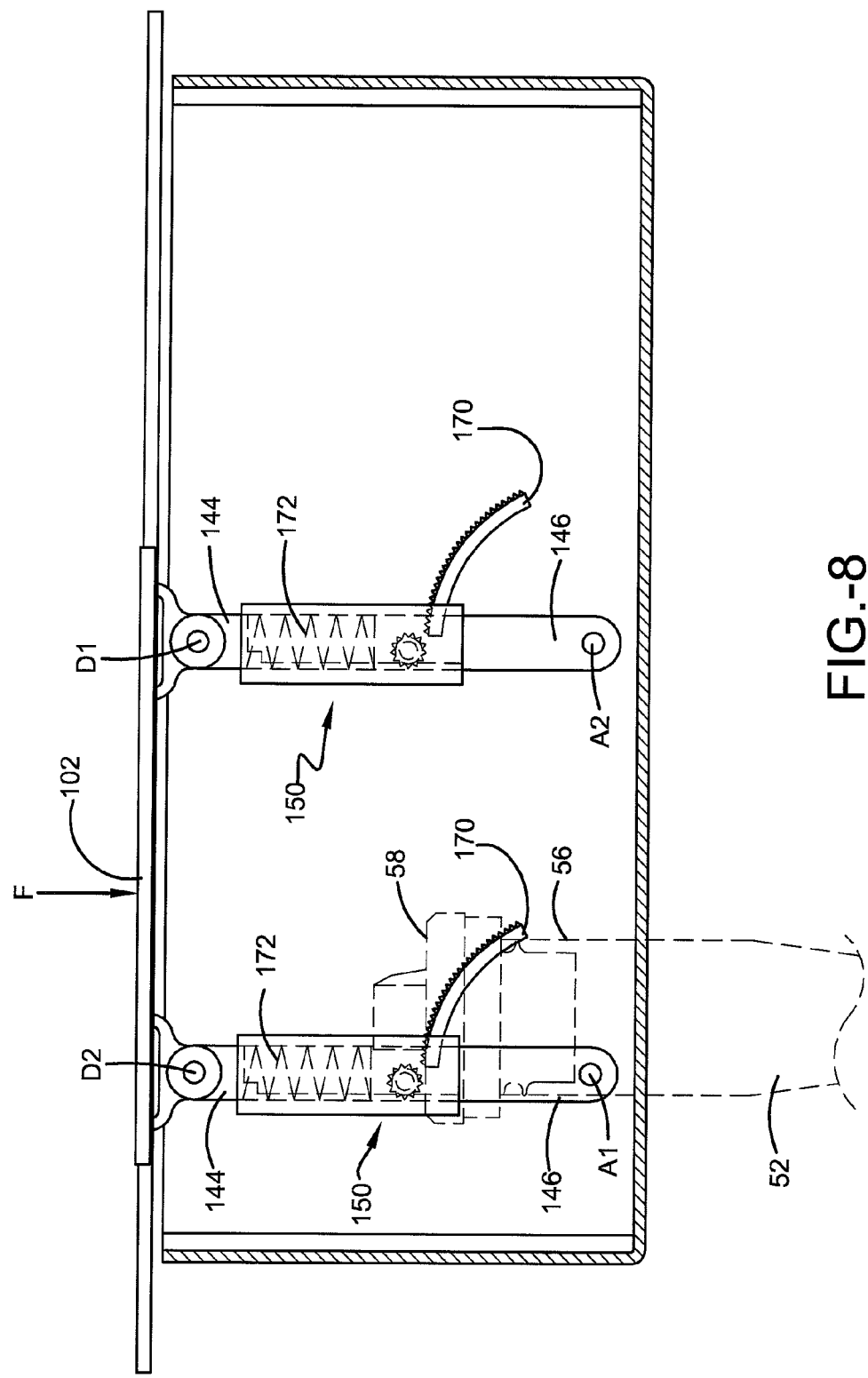
FIG. 8 is a view similar to that shown in FIG. 3 but showing a fuel lid apparatus according to another embodiment of this invention.
Figure 9:
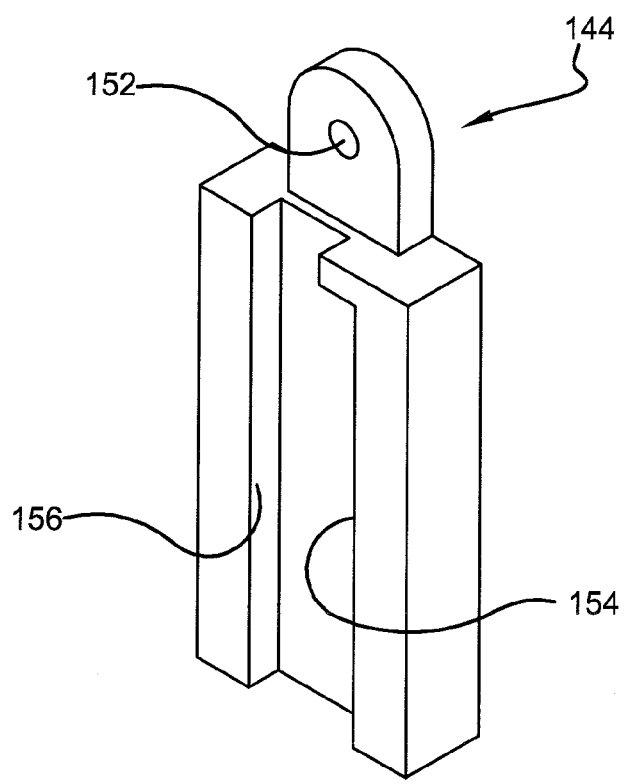
FIG. 9 is a perspective view showing some of the components used to make the embodiment of FIG. 8.
Figure 9:
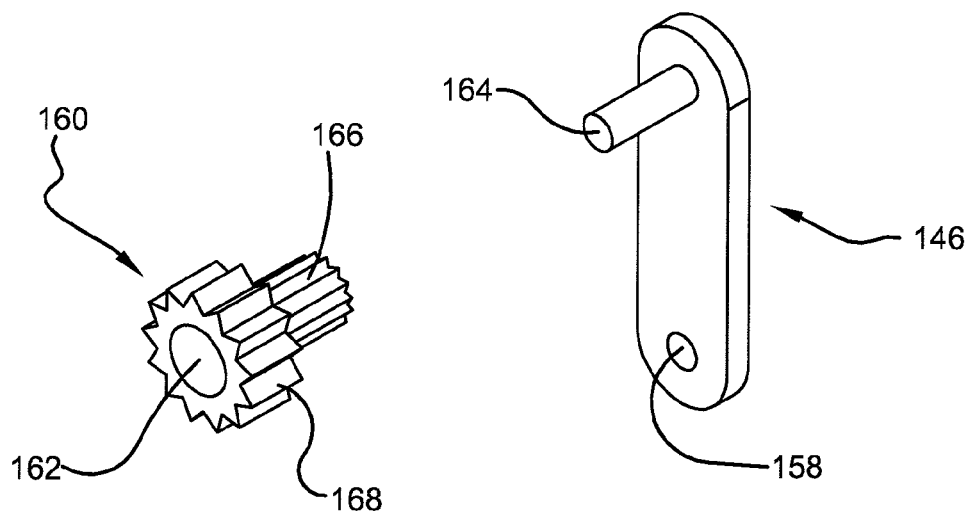

FIGS. 8-9 show another embodiment of this invention where at least one of the linkage members (all four B1, B2, B3, B4 shown) have first and second members 144, 146 that move telescopically with respect to each other. The first member 144 may include a hole 152 that receives the pin defining the pivotal connection D1 and/or D2. In addition, the first member 144 may include a gear rack 154. While the gear rack 154 can be positioned in any location chosen with the sound judgment of a person of skill in the art, for the embodiment shown the gear rack 154 is formed in a channel 156. The second member 146 may include a hole 158 that receives the pin defining the pivotal connection A1 and/or A2. With this arrangement the second member 146 can pivot about the pivotal connection but cannot move along its longitudinal axis. A rotatable gear 160 may be attached to the second member 146 in any manner chosen with the sound judgment of a person of skill in the art. In one embodiment, the rotatable gear 160 may have an aperture 162 that rotatably receives a pin 164 that extends from the second member 146. The rotatable gear 160 may have a first set of teeth 166 that permits the rotatable gear 160 to rotate as the first set of teeth 166 engage the gear rack 154 formed on the first member 144 as the length of the linkage member is varied. The rotatable gear 160 may also have a second set of teeth 168 that engage the teeth of a gear rack 170 fixedly attachable to the vehicle 30. In one embodiment, the gear rack 170 is attached to the adaptor box 130. The gear rack 170 can have any shape chosen with the sound judgment of a person of skill in the art. For the embodiment shown, the gear rack 170 is arced to match the curvature of the linkage members as they rotate about their pivotal connections. A compression spring 172 may be operatively positioned between the first and second members 144, 146.

With reference now to FIGS. 1-7, the general operation of the fuel lid apparatus 100 will now be described. The general operation is very simple, to open the lid 102, the lid 102 is pivoted about the pivotal attachments A1, A2, D1, D2 of the linkage members B1, B2, B3, B4, from: (1) a first closed condition where the lid 102 substantially closes the opening 48 preventing access to the fuel filling pipe 52 through the opening 48; to, (2) a second open condition where the lid 102 provides access to the fuel filling pipe 52 through the opening 48. The movement of the lid 102 can be achieved in any manner chosen with the sound judgment of a person of skill in the art. In one embodiment, the movement of the lid 102 may be achieved by manual contact by an operator. In another embodiment, the movement of the lid 102 may be achieved with a drive unit (not shown). The direction of this movement may also be any chosen with the sound judgment of a person of skill in the art, such as side to side motion and up and down motion. As noted above, in one embodiment the lid 102 may be positioned inside the outside surface 60 of the vehicle 30 when the fuel lid apparatus 100 is in the closed condition and also when the fuel lid apparatus 100 is in the open condition. In another embodiment, the lid 102 may be maintained inside the outside surface 60 of the vehicle 30 at all times when the fuel lid apparatus 100 is being moved between the closed condition and the open condition. If any of the linkage members have variable effective lengths, then these lengths may vary as the fuel lid apparatus 100 is moved, as described above. Once placed into the closed condition, the lid 102 may be locked into place with a lock mechanism (not shown). To open the lid 102, it is only necessary to reverse the procedure—move the lid 102 about the pivotal attachments A1, A2, D1, D2 of the linkage members B1, B2, B3, B4, from an open condition where the lid 102 provides access to the fuel filling pipe 52 through the opening 48 to a closed condition where the lid 102 substantially closes from 48 preventing access to the fuel filling pipe 52 through the opening 48.

Operation of the fuel lid apparatus 100 shown in FIGS. 8-9 will now be described. For this embodiment with the lid 102 beginning in the closed condition, the lid 102 is first pushed inwardly with respect to the opening 48. This pushing force F overcomes the biasing force of the springs 172 (by compressing the springs 172) and causes the first members 144 to move with respect to the second members 146 along the longitudinal axis of the linkage members. Specifically, as each first member 144 moves along the longitudinal axis of the corresponding second member 146, the rotatable gear 160 rotates about the pin 164 as the first set of teeth 166 engage the teeth of the gear rack 154 formed on the first member 144. As the first members 144 near the end of their stroke along each gear rack 154, the second sets of teeth 168 on the rotatable gear 160 engage the teeth of the gear racks 170 that are fixed with respect to the vehicle 30. Engagement with the gear racks 170 may be used to stop or limit the inward motion of the first member 144. At this point, the operator may release the pushing force from the lid 102. The springs 172 will cause the first members 144 to move along the longitudinal axis of the linkage members relative to the second members 146. Thus, the springs 172 will decompress. As the first members 144 move as stated above, the gear rack 154 with its teeth already engaging the first set of teeth 166 of the rotatable gear 160, will cause the rotatable gear 160 to rotate about the pin 164. This rotation and the fact that the second set of teeth 168 of the rotatable gear 160 engage the teeth of the gear rack 170, will cause a rotation of the linkage members about their pivotal attachments. The lid 102 is then moved laterally, as the linkage members pivot about their pivotal attachments.

With continuing reference to FIGS. 8-9, to close the lid 102, it is only necessary to reverse the procedure—move the first and second members 144, 146 together about their pivotal attachments A1, A2 until the rotatable gears 160 approach the end of their engagement with the gear racks 170. As the linkage members move as stated above, the first set of teeth 166, being engaged with the gear rack 154, will cause motion of the first members 144 relative to the second members 146 along the longitudinal axis of the linkage members, thus causing compression of the springs 172. At this point the lid 102 can be released and the springs 172 will force the first members 144 to move outwardly with respect to the second members 146 until the lid 102 contacts the panel 46 juxtaposed to the opening 48.

Numerous embodiments have been described, hereinabove. It will be apparent to those skilled in the art that the above methods and apparatuses may incorporate changes and modifications without departing from the general scope of this invention. Dampening devices, for example, may be included to control the open and/or close speed of the lid. The dampening devices may be of any variety known to those of skill in the art. It is intended to include all such modifications and alterations insofar as they come within the scope of the appended claims or the equivalents thereof.

Having thus described the invention, it is now claimed:

1. A fuel lid apparatus for use with an associated vehicle having an outside surface with an opening, a fuel filling pipe used to communicate fuel from the opening to a fuel tank and a panel defining the outside surface and the opening, the fuel lid apparatus comprising:
   a lid;
   a linkage assembly comprising first and second linkage members each having a first portion pivotally attachable to the associated vehicle and a second portion pivotally attachable to the lid;
   a support structure having a first portion that is attachable to the panel and a second portion that is attachable to the fuel filling pipe, the support structure defining an inner space into which an end of the fuel filling pipe extends when the fuel lid apparatus is attached to the associated vehicle;
   wherein the second portions of the first and second linkage members are pivotally attachable to the support structure;
   wherein the lid is movable about the pivotal attachments, when the fuel lid apparatus is attached to the associated vehicle, between: (1) a first closed condition where the lid substantially closes the opening preventing access to the fuel filling pipe through the opening; and, (2) a second open condition where the lid provides access to the fuel filling pipe through the opening; and,
   wherein the lid is positioned substantially within the inner space of the support structure when the fuel lid apparatus is in the second open condition.

2. A fuel lid apparatus for use with an associated vehicle having an outside surface with an opening and a fuel filling pipe used to communicate fuel from the opening to a fuel tank, the fuel lid apparatus comprising:
   a lid;
   a linkage assembly comprising first, second, third and fourth linkage members each having a first portion pivotally attachable to the associated vehicle and a second portion pivotally attachable to the lid;
   wherein the lid is movable about the pivotal attachments, when the fuel lid apparatus is attached to the associated vehicle, between: (1) a first closed condition where the lid substantially closes the opening preventing access to the fuel filling pipe through the opening; and, (2) a second open condition where the lid provides access to the fuel filling pipe through the opening;
   wherein the first and third linkage member are substantially the same size and shape and remain substantially parallel to each other as the fuel lid apparatus is being moved between the first closed condition and the second open condition;
   wherein the second and fourth linkage member are substantially the same size and shape and remain substantially parallel to each other as the fuel lid apparatus is being moved between the first closed condition and the second open condition; and,
   wherein the first and second linkage member are substantially different in at least one of size and shape, and are not substantially parallel to each other as the fuel lid apparatus is being moved between the first closed condition and the second open condition.

3. The fuel lid apparatus of claim 2 wherein:
   the first and third linkage member are above a horizontal plane that intersects a vertical midpoint of the end of the fuel filling pipe closer to the opening; and,
   the second and fourth linkage member are below the horizontal plane.

4. A fuel lid apparatus for use with an associated vehicle having an outside surface with an opening and a fuel filling pipe used to communicate fuel from the opening to a fuel tank, the fuel lid apparatus comprising:
   a lid;
   a linkage assembly comprising first and second linkage members each having a first portion pivotally attachable to the associated vehicle and a second portion pivotally attachable to the lid;
   wherein the lid is movable about the pivotal attachments, when the fuel lid apparatus is attached to the associated vehicle, between: (1) a first closed condition where the lid substantially closes the opening preventing access to the fuel filling pipe through the opening; and, (2) a second open condition where the lid provides access to the fuel filling pipe through the opening; and,
   wherein at least one of the first and second linkage members has an effective length that varies as the fuel lid apparatus is moved between the first closed condition and the second open condition.

5. The fuel lid apparatus of claim 4 wherein:
   the at least one of the first and second linkage members that has an effective length that varies comprises a slot with a longitudinal axis; and,
   a pin defining one of the pivotal attachments is received within the slot and moves along the longitudinal axis as the fuel lid apparatus is moved between the first closed condition and the second open condition.

6. The fuel lid apparatus of claim 4 wherein:
   the at least one of the first and second linkage members that has an effective length that varies comprises first and second members where the first member moves telescopically with respect to the second member as the fuel lid apparatus is moved between the first closed condition and the second open condition.

7. The fuel lid apparatus of claim 6 wherein:
   the first member has a first gear rack; and,
   the second member has a rotatable gear with a first set of teeth that rotates as the first set of teethe engage the first gear rack as the length is varied.

8. The fuel lid apparatus of claim 7 wherein:
   the fuel lid apparatus further comprises a second gear rack fixedly attachable to the associated vehicle; and,
   the rotatable gear has a second set of teeth that engage the second gear rack to rotate the linkage members about their pivotal attachments and open the lid.

9. A method comprising the steps of:
(A) providing a fuel lid apparatus for use with an associated vehicle having an outside surface with an opening and a fuel filling pipe used to communicate fuel from the opening to a fuel tank;
(B) providing the fuel lid apparatus with a lid; and, a linkage assembly comprising first and second linkage members each having a first portion pivotally attachable directly to the associated vehicle and a second portion pivotally attachable to the lid;
(C) moving the lid about the pivotal attachments, when the fuel lid apparatus is attached to the associated vehicle, between: (1) a first closed condition where the lid substantially closes the opening preventing access to the fuel filling pipe through the opening; and, (2) a second open condition where the lid provides access to the fuel filling pipe through the opening;
wherein step (B) comprises the step of: providing the linkage assembly with third and fourth linkage members each having a first portion pivotally attachable directly to the associated vehicle and a second portion pivotally attachable to the lid; and,
wherein step (C) comprises the steps of:
 (1) pivoting the first and third linkage members about their pivotal attachments to the associated vehicle in a relative clockwise direction; and,
 (2) pivoting the second and fourth linkage members about their pivotal attachments to the associated vehicle in a relative counterclockwise direction.

10. A method comprising the steps of:
(A) providing a fuel lid apparatus for use with an associated vehicle having an outside surface with an opening and a fuel filling pipe used to communicate fuel from the opening to a fuel tank;
(B) providing the fuel lid apparatus with a lid; and, a linkage assembly comprising first and second linkage members each having a first portion pivotally attachable to the associated vehicle and a second portion pivotally attachable to the lid;
(C) moving the lid about the pivotal attachments, when the fuel lid apparatus is attached to the associated vehicle, between: (1) a first closed condition where the lid substantially closes the opening preventing access to the fuel filling pipe through the opening; and, (2) a second open condition where the lid provides access to the fuel filling pipe through the opening;
wherein step (B) comprises the step of: providing at least one of the first and second linkage members to have a variable effective length; and,
wherein step (C) comprises the step of: changing the effective length of the at least one of the first and second linkage members as the fuel lid apparatus is moved between the first closed condition and the second open condition.

11. A method comprising the steps of:
(A) providing a fuel lid apparatus for use with an associated vehicle having an outside surface with an opening and a fuel filling pipe used to communicate fuel from the opening to a fuel tank;
(B) providing the fuel lid apparatus with a lid; and, a linkage assembly comprising first and second linkage members each having a first portion pivotally attachable to the associated vehicle and a second portion pivotally attachable to the lid;
(C) moving the lid about the pivotal attachments, when the fuel lid apparatus is attached to the associated vehicle, between: (1) a first closed condition where the lid substantially closes the opening preventing access to the fuel filling pipe through the opening; and, (2) a second open condition where the lid provides access to the fuel filling pipe through the opening; and,
wherein step (C) comprises the steps of:
 (1) pushing the lid inwardly with respect to the opening; and,
 (2) moving the lid laterally to provide access to the fuel filling pipe through the opening.

12. The method of claim 11 wherein:
step (B) comprises the step of: providing at least one of the first and second linkage members to have a variable effective length;
step (C)(1) comprises the step of: shortening the effective length of the at least one of the first and second linkage members; and,
step (C)(2) comprises the step of: pivoting the first and second linkage members about their pivotal attachments to the associated vehicle.

* * * * *